(12) United States Patent
Iwai et al.

(10) Patent No.: US 9,832,984 B2
(45) Date of Patent: Dec. 5, 2017

(54) BRAKE PLATE ASSEMBLY FOR A DRAG MECHANISM OF A FISHING REEL

(71) Applicant: Shimano Inc., Sakai, Osaka (JP)

(72) Inventors: Toru Iwai, Osaka (JP); Yoshikazu Kashimoto, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 423 days.

(21) Appl. No.: 14/620,485

(22) Filed: Feb. 12, 2015

(65) Prior Publication Data

US 2015/0305315 A1  Oct. 29, 2015

(30) Foreign Application Priority Data

Apr. 28, 2014 (JP) .................................. 2014-92498

(51) Int. Cl.
*A01K 89/01* (2006.01)
*A01K 89/033* (2006.01)
*A01K 89/02* (2006.01)
*A01K 89/027* (2006.01)

(52) U.S. Cl.
CPC ............ *A01K 89/033* (2013.01); *A01K 89/02* (2013.01); *A01K 89/027* (2013.01)

(58) Field of Classification Search
CPC .... A01K 89/027; A01K 89/03; A01K 89/033; A01K 89/057
See application file for complete search history.

(56) References Cited

U.S. PATENT DOCUMENTS

| 3,428,268 | A | * | 2/1969 | Fleischer | ............ | A01K 89/033 |
| | | | | | | 242/269 |
| 4,770,364 | A | * | 9/1988 | Sato | ........................ | A01K 89/02 |
| | | | | | | 242/270 |
| 5,040,743 | A | | 8/1991 | Zurcher et al. | | |
| 6,572,044 | B2 | * | 6/2003 | Hitomi | ............... | A01K 89/0111 |
| | | | | | | 242/224 |
| 7,017,845 | B2 | | 3/2006 | Clark | | |
| 2002/0027176 | A1 | | 3/2002 | Ikuta | | |
| 2009/0152389 | A1 | * | 6/2009 | Ochiai | ............... | A01K 89/0108 |
| | | | | | | 242/231 |
| 2013/0233957 | A1 | * | 9/2013 | Niitsuma | ............. | A01K 89/015 |
| | | | | | | 242/285 |
| 2013/0292504 | A1 | | 11/2013 | Hyun | | |

FOREIGN PATENT DOCUMENTS

| JP | 2000004740 A | * | 1/2000 | ........... | A01K 89/033 |
| JP | 2002-238421 A | | 8/2002 | | |
| JP | 2003-114 A | | 1/2003 | | |

OTHER PUBLICATIONS

European Search Report of corresponding European Patent Application No. 15 16 1363.5 dated Sep. 24, 2015.

* cited by examiner

*Primary Examiner* — Emmanuel M Marcelo
(74) *Attorney, Agent, or Firm* — Global IP Counselors, LLP (57) ABSTRACT

A brake plate assembly in a drag mechanism of a fishing reel includes a first brake plate and a second brake plate. The first brake plate has a first bonding surface. The second brake plate has a second bonding surface bonded to the first bonding surface, and has greater wear resistance than that of the first brake plate.

19 Claims, 6 Drawing Sheets

BRAKE PLATE ASSEMBLY FOR A DRAG MECHANISM OF A FISHING REEL

CROSS-REFERENCE TO RELATED APPLICATIONS

This application claims priority to Japanese Patent Application No. JP2014-92498, filed Apr. 28, 2014, the entirety of which is hereby incorporated by reference in its entirety.

BACKGROUND

Field of the Invention

The present invention relates to a brake plate assembly for a drag mechanism of a fishing reel. The present invention also relates to a fishing reel having a brake plate assembly for a drag mechanism.

Background Information

In general, a fishing reel comprises a drag mechanism. A drag mechanism applies a braking force to a spool when the spool rotates in the line unreeling (delivering) direction. In particular, in a drag mechanism, a braking structure is able to brake a spool via a rotation transmission mechanism. Here, the rotation transmission mechanism is configured by a drive shaft, a drive gear, a pinion gear, etc.

Specifically, the braking structure comprises a plurality of brake plates and a plurality of lining materials. The lining materials are disposed between adjacent brake plates and generate frictional force along with the brake plates. In such a braking structure, the pressure state of the brake plate and the lining material, that is, the frictional force of the brake plate and the lining material are changed by a drag adjustment mechanism. Accordingly, the braking force (the drag force) that is applied to the spool is changed.

Fiber material, such as wool felt, or a resin material, such as PTFE, are used as material for a conventional lining material. Grease is applied to a wool felt lining material when this is used. In contrast, since a PTFE lining material is formed by a resin material, the plate thickness can be molded to be thin, as compared to a wool felt lining material. Additionally, the PTFE lining material is only slightly deformed by compression and does not require the application of grease. In this manner, the PTFE lining material can have a more favorable characteristic than a wool felt lining material (refer to Japanese Laid-Open Patent Publication No. 2002-218880 and Japanese Laid-Open Patent Publication No. 2002-238421).

Meanwhile, there are cases in which the lining material, with a mixture of reinforcing fiber material, is used to enhance the heat resistance, durability, and flexibility of the lining material. Here, the reinforcing fiber is a fibrous material with excellent heat resistance and wear resistance. Specifically, carbon fiber, aramid fiber, glass fiber, etc., are used as the reinforcing fiber (refer to Japanese Laid-Open Patent Publication No. 2003-000114).

As described above, conventionally, the performance of braking structures of drive mechanisms has been improved by using various lining materials. However, in recent years, as the performance of fishing reels has improved, further improvement in the performance of the braking structure have been expected. For example, various attempts have been made to exert a greater drag force than conventional technology by improving the frictional force in the braking structure. More specifically, attempts have been made to use a metal-based sintered material for the lining material of the braking structure.

When a metal-based sintered material is used for the lining material and the lining material slides with a conventional brake plate, such as an aluminum brake plate, there is the risk that the brake plate will be worn out due to the friction between the lining material and the brake plate. That is, there is the risk that the frictional force between the lining material and the brake plate will decline and that the drag force that was assumed at the time of design cannot be maintained. On the other hand, when the brake plate is changed to a material that is harder than the above-described material in order to solve this problem, such as a stainless steel material, the weight of the brake plate will increase. That is, a problem occurs when the weight of the entire reel increases.

SUMMARY

The present invention was made in light of the problems described above, and an object of the present invention is to provide a brake plate assembly for a drag mechanism that is able to simultaneously enhance the drag force as well as reduce the weight. Another object is to provide a fishing reel having this brake plate assembly for a drag mechanism.

A brake plate assembly for a drag mechanism of a fishing reel according to the first aspect of the invention comprises a first brake plate and a second brake plate. The first brake plate comprises a first bonding surface. The second brake plate comprises a second bonding surface. The second bonding surface is bonded to the first bonding surface of the first brake plate. The wear resistance of the second brake plate is greater than that of the first brake plate.

In the present brake plate assembly, the first bonding surface of the first brake plate and the second bonding surface of the second brake plate are bonded together. A brake plate assembly having this configuration functions as a standalone brake plate. Additionally, since the wear resistance of the second brake plate is greater than that of the first brake plate, there is the possibility that a lining material can come into frictional contact with the second brake plate. That is, in the present brake plate assembly, the portion where the lining material comes into frictional contact is formed by the second brake plate, and the portion where the lining material does not come into frictional contact is formed by the first brake plate. Accordingly, the drag force can be enhanced by the second brake plate, and the weight can be reduced with the first brake plate. That is, it is possible to provide a brake plate assembly for a drag mechanism that is able to simultaneously enhance the drag force and reduce the weight.

In a brake plate assembly for a drag mechanism of a fishing reel according to the second aspect of the invention, the first brake plate in the brake plate assembly recited in the first aspect of the invention is an aluminum alloy.

In this embodiment, since the first brake plate is an aluminum alloy, the weight of the brake plate assembly can be reduced.

In a brake plate assembly for a drag mechanism of a fishing reel according to the third aspect of the invention, the second brake plate in the brake plate assembly recited in the first or second aspect of the invention is a stainless steel alloy.

In this embodiment, since the second brake plate is a stainless steel alloy, the wear resistance of the brake plate assembly can be enhanced.

In a brake plate assembly for a drag mechanism of a fishing reel according to the fourth aspect of the invention, either the first brake plate or the second brake plate in the brake plate assembly recited in any one of the first to the third aspects of the invention comprises at least one first hole.

In this embodiment, it is possible to reduce the weight of the brake plate assembly by forming at least one first hole in at least one of the first brake plate or the second brake plate.

In a brake plate assembly for a drag mechanism of a fishing reel according to the fifth aspect of the invention, the first hole in the brake plate assembly recited in the fourth aspect of the invention extends through in the thickness direction of at least one of the first brake plate or the second brake plate.

In this embodiment, effectively reducing the weight while maintaining the strength of a brake plate is possible by forming a first hole in the thickness direction of at least one of the first brake plate or the second brake plate.

In a brake plate assembly for a drag mechanism of a fishing reel according to the sixth aspect of the invention, the first hole in the brake plate assembly recited in the fourth or fifth aspects of the invention extends in a direction that intersects with the thickness direction described above.

In this embodiment, since the first hole extends in a direction that intersects with the thickness direction described above, effectively reducing the weight while maintaining the bonding strength is possible because the bonding area of the bonding surfaces of the first brake plate and the second brake plate (the first bonding surface and the second bonding surface) can be maintained.

A brake plate assembly for a drag mechanism of a fishing reel according to the seventh aspect of the invention further comprises a third brake plate in a brake plate assembly recited in any one of the first to the sixth aspects of the invention. The first brake plate further comprises a third bonding surface. The third bonding surface is disposed on the opposite side of the first bonding surface of the first brake plate. The third brake plate comprises a fourth bonding surface. The fourth bonding surface is bonded to the third bonding surface of the first brake plate. The wear resistance of the third brake plate is greater than that of the first brake plate.

In this embodiment, the first bonding surface of the first brake plate and the second bonding surface of the second brake plate are bonded together, and the third bonding surface of the first brake plate and the fourth bonding surface of the third brake plate are bonded together. That is, the brake plate assembly functions as a standalone brake plate in a state in which the first brake plate is disposed between the second brake plate and the third brake plate.

Additionally, in this embodiment, since the wear resistance of the second brake plate and the wear resistance of the third brake plate are greater than that of the first brake plate, there is the possibility that a lining material can come into frictional contact with the second brake plate and the third brake plate. That is, in the present brake plate assembly, the portion where the lining material comes into frictional contact is formed by the second brake plate and the third brake plate, and the portion where the lining material does not come into frictional contact is formed by the first brake plate. Accordingly, the drag force can be enhanced by the second brake plate and the third brake plate, and the weight can be reduced with the first brake plate. That is, it is possible to provide a brake plate assembly for a drag mechanism that is able to simultaneously enhance the drag force and reduce the weight.

In a brake plate assembly for a drag mechanism of a fishing reel according to the eighth aspect of the invention, the third brake plate in the brake plate assembly recited in the seventh aspect of the invention is configured by a stainless steel alloy.

In this embodiment, since the third brake plate is formed by a stainless steel alloy, the wear resistance of the brake plate assembly can be enhanced.

In a brake plate assembly for a drag mechanism of a fishing reel according to the ninth aspect of the invention, the wear resistance of the third brake plate is greater than that of the second brake plate in the brake plate assembly recited in the seventh or eighth aspect of the invention.

In this embodiment, since the wear resistance of the third brake plate is greater than that of the second brake plate, it is possible to form the lining material on the third brake plate side from a material with a higher friction strength or a material with a different characteristic than the lining material on the second brake plate side. In this manner, since the selection of lining material can be widened, the adjustment range of the drag performance (the friction performance) can be expanded.

In a brake plate assembly for a drag mechanism of a fishing reel according to the tenth aspect of the invention, the thickness of the third brake plate is greater than the thickness of the second brake plate in a brake plate assembly recited in any one of the seventh to the ninth aspects of the invention.

In this embodiment, since the thickness of the third brake plate is greater than the thickness of the second brake plate, it is possible to form the lining material on the third brake plate side from a material with a higher friction strength or a material with a different characteristic than the lining material on the second brake plate side. In this manner, since the selection of lining material can be widened, the adjustment range of the drag performance (the friction performance) can be expanded.

In a brake plate assembly for a drag mechanism of a fishing reel according to the eleventh aspect of the invention, the third brake plate in the brake plate assembly recited in any one of the seventh to the tenth aspects of the invention comprises at least one second hole.

In this embodiment, reducing the weight of the third brake plate, that is, the brake plate assembly, is possible by forming at least one second hole in the third brake plate.

In a brake plate assembly for a drag mechanism of a fishing reel according to the twelfth aspect of the invention, the second hole in the brake plate assembly recited in the eleventh aspect of the invention extends through the thickness direction of the third brake plate.

In this embodiment, effectively reducing the weight while maintaining the strength of a brake plate is possible by forming a second hole in the thickness direction of the third brake plate.

In a brake plate assembly for a drag mechanism of a fishing reel according to the thirteenth aspect of the invention, the second hole in the brake plate assembly recited in the eleventh or twelfth aspect of the invention extends in a direction that intersects with the thickness direction described above.

In this embodiment, since the second hole extends in a direction that intersects the thickness direction described above, it is possible to effectively reduce the weight while maintaining the bonding strength because the bonding area of the bonding surfaces of the first brake plate and the third brake plate (the third bonding surface and the fourth bonding surface) can be maintained.

The fishing reel according to the fourteenth aspect of the invention comprises a reel body, a spool, and a drag mechanism. The spool is rotatably mounted to the reel body. The drag mechanism comprises a braking structure. The braking structure is capable of braking the rotation of the spool in the casting (line delivering) direction. The braking structure comprises a lining material and a brake plate assembly recited in any one of the first to the thirteenth aspect of the invention.

In the present fishing reel, the braking structure of the drag mechanism is capable of braking the rotation of the spool in the casting direction. In this embodiment, since the braking structure comprises a lining material and a brake plate assembly recited in any one of the first to the thirteenth aspect of the invention, the same effect as that described above can also be obtained in the present fishing reel.

In the fishing reel according to the fifteenth aspect of the invention, the lining material in the fishing reel recited in the fourteenth aspect of the invention is a metal-based sintered material.

In this embodiment, since the lining material is a metal-based sintered material, it is possible to enhance the drag force. Additionally, even if the lining material is a metal-based sintered material, it is possible to reduce the weight of the brake plate assembly described above.

The fishing reel according to the sixteenth aspect of the invention comprises a reel body, a spool, and a drag mechanism. The spool is rotatably mounted to the reel body. The drag mechanism comprises a braking structure. The braking structure is capable of braking the rotation of the spool in the casting direction. The braking structure comprises a first lining material, a second lining material, a first brake plate assembly, and a second brake plate assembly.

The first brake plate assembly comprises a fourth brake plate and a fifth brake plate. The fourth brake plate comprises a fifth bonding surface. The wear resistance of the fifth brake plate is greater than that of the fourth brake plate. The fifth brake plate comprises a sixth bonding surface and a first frictional contact surface. The sixth bonding surface is bonded to the fifth bonding surface of the fourth brake plate. The first frictional contact surface comes into frictional contact with the first lining material.

The second brake plate comprises a sixth brake plate, a seventh brake plate, and an eighth brake plate. The sixth brake plate comprises a seventh bonding surface and an eighth bonding surface. The eighth bonding surface is disposed on the opposite side of the seventh bonding surface. The wear resistance of the seventh brake plate is greater than that of the sixth brake plate. The seventh brake plate comprises a ninth bonding surface and a second frictional contact surface. The ninth bonding surface is bonded to the seventh bonding surface of the sixth brake plate. The second frictional contact surface comes into frictional contact with the first lining material. The wear resistance of the eighth brake plate is greater than that of the sixth brake plate. The eighth brake plate comprises a tenth bonding surface and a third frictional contact surface. The tenth bonding surface is bonded to the eighth bonding surface of the sixth brake plate. The third frictional contact surface comes into frictional contact with the second lining material.

In the present fishing reel, the braking structure comprises a first lining material, a second lining material, a first brake plate assembly, and a second brake plate assembly. The first brake plate assembly functions as a standalone brake plate in a state in which the fourth brake plate and the fifth brake plate are bonded together, as described above. Additionally, the fifth brake plate comes into frictional contact with the first lining material. The second brake plate assembly functions as a standalone brake plate in a state in which the sixth brake plate is disposed between the seventh brake plate and the eighth brake plate, as described above. The second brake plate assembly (the seventh brake plate and the eighth brake plate) also comes into frictional contact with the first lining material and the second lining material.

Accordingly, in the present fishing reel, it is possible to reduce the weight of the brake plate assembly with the fourth brake plate of the first brake plate assembly and the sixth brake plate of the second brake plate assembly. Additionally, it is possible to enhance the drag force with the fifth brake plate of the first brake plate assembly and the seventh brake plate and the eighth brake plate of the second brake plate assembly. That is, it is possible to provide a fishing reel that is capable of simultaneously enhancing the drag force and reduce the weight.

In the fishing reel according to the seventeenth aspect of the invention, the first lining material and the second lining material in the fishing reel recited in the sixteenth aspect of the invention is a metal-based sintered material.

In this embodiment, since the first lining material and the second lining material are formed by a metal-based sintered material, it is possible to enhance the drag force. Additionally, even if the first lining material and the second lining material are formed by a metal-based sintered material, it is possible to reduce the weight of the first brake plate assembly and the second brake plate assembly.

In the fishing reel according to the eighteenth aspect of the invention, the drag mechanism in the fishing reel recited in the sixteenth aspect of the invention r the seventeenth invention aspect of the invention further comprises an adjustment member for adjusting the first brake plate assembly.

In this embodiment, the first brake plate assembly is adjusted by the adjustment member. Then, the pressure state between the brake plate assembly (the first brake plate assembly and the second brake plate assembly) and the lining material (the first lining material and the second lining material), that is the frictional force between the brake plate assembly and the lining material, changes. That is, when the first brake plate assembly is adjusted by the adjustment member, the frictional force in the braking structure changes. In this manner, in the present fishing reel, it is possible to reliably change the frictional force in the braking structure by the adjustment member.

According to embodiments of the present invention, it is possible to provide a brake plate assembly for a drag mechanism that is capable of simultaneously enhancing the drag force and reducing the weight. Additionally, it is possible to provide a fishing reel having this brake plate assembly for a drag mechanism.

DETAILED DESCRIPTION OF THE EMBODIMENTS

Figure 1:
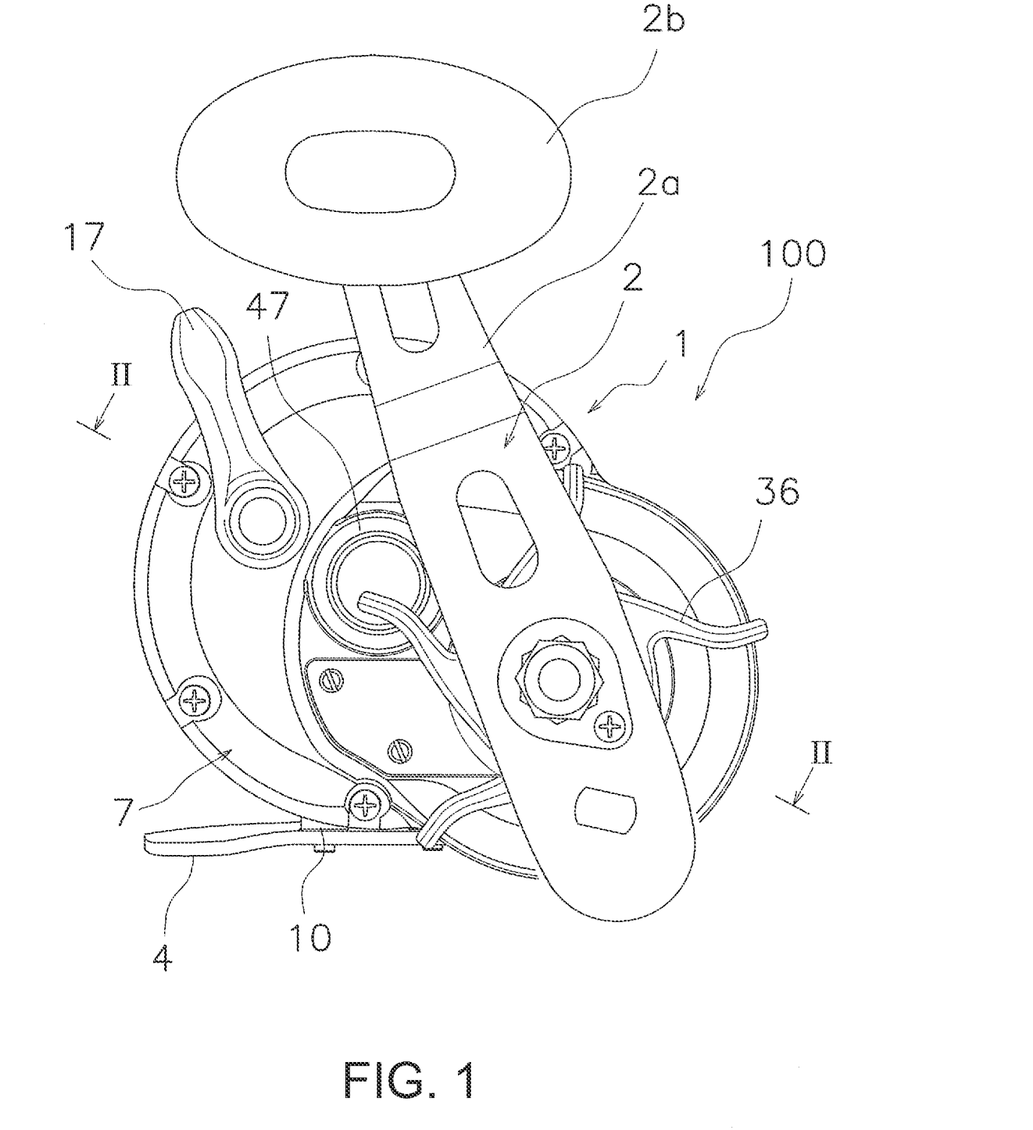
FIG. 1 is a side view of a dual-bearing reel according to one embodiment of the present invention.
Figure 2:
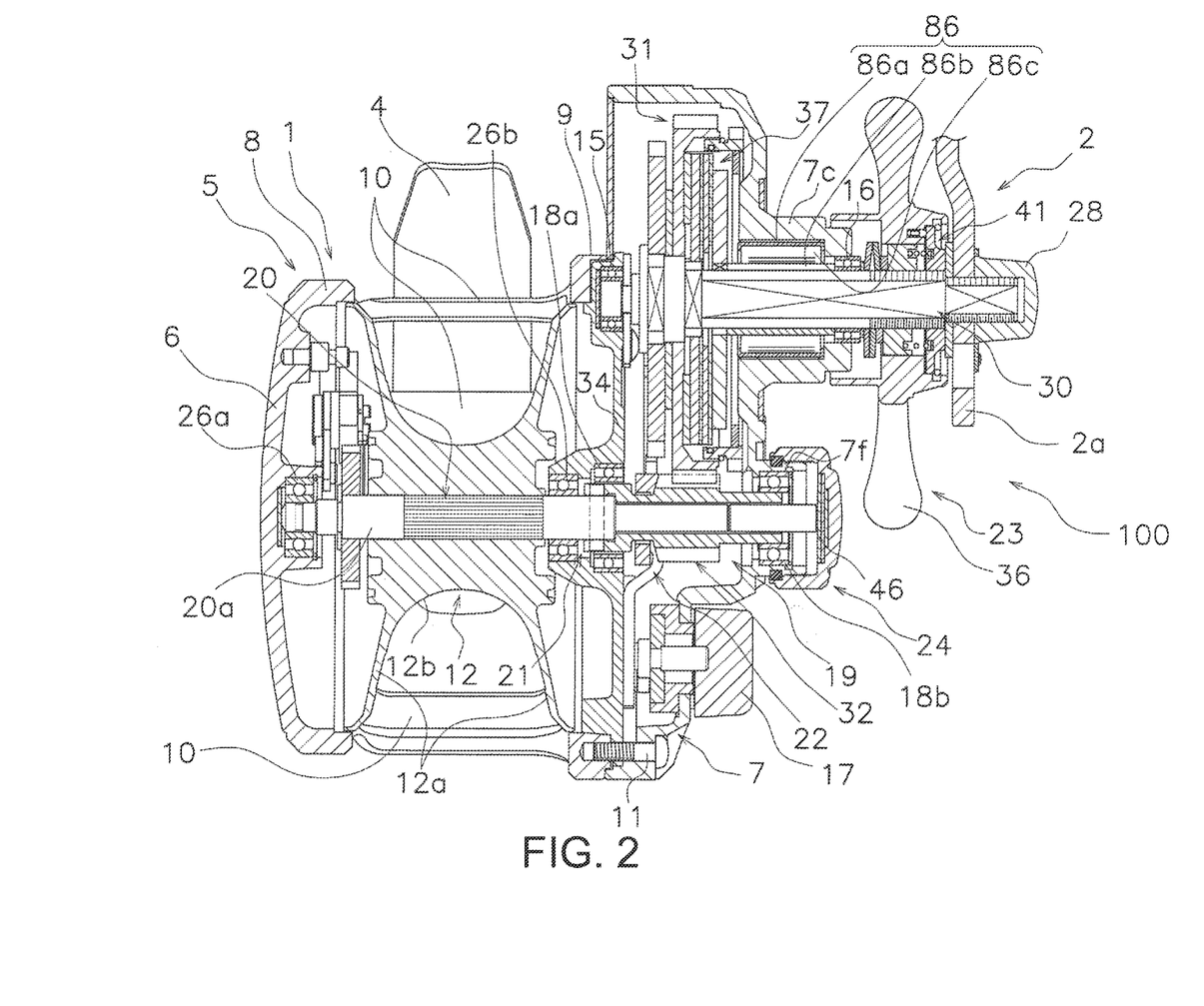
FIG. 2 is a cross-sectional view of the section line II-II in FIG. 1.

As shown in FIG. 1 and FIG. 2, the dual-bearing reel 100 comprises a reel body 1, a handle 2 that is disposed on the side of the reel body 1, and a spool 12 that is rotatably mounted inside the reel main body 1.

Meanwhile, in the explanation below, there are descriptions including wording indicating the left, right, front, and rear. In these descriptions, the direction in which the fishing line is unreeled (or cast) when the dual-bearing reel 100 is mounted to the fishing rod corresponds to the front. Additionally, the left and right are defined by looking at the dual-bearing reel 100 from the rear in the above-described state.

Handle

As shown in FIG. 1, the handle 2 comprises a plate-like arm portion 2a and a grip 2b that is rotatably mounted to the distal end of the arm portion 2a. The proximal end of the arm portion 2a is integrally and rotatably mounted to the distal end of a drive shaft 30 mentioned below, as shown in FIG. 2. Specifically, the proximal end of the arm portion 2a is fastened to the drive shaft 30 by a nut 28.

Reel Body

The reel body 1 comprises a frame 5, a first side cover 6 and a second side cover 6 that are mounted on both sides of the frame 5, as shown in FIG. 2. A spool 12 is rotatably mounted inside the reel body 1 via a spool shaft 20.

The frame 5 comprises a left and right pair of a ring-shaped first side plate 8 and second side plate 9, which are disposed at a prescribed interval, and a plurality of connecting portions 10 that couple the first side plate 8 and the second side plate 9.

The plurality of connecting portions 10 are integrally formed with the first side plate 8 and the second side plate 9. A longitudinally long rod mounting leg portion 4 for mounting a reel to the fishing rod is riveted to the connecting portion 10 (refer to FIG. 1).

The first side cover 6 is integrally formed with the first side plate 8. The first side cover 6 rotatably supports the left end of a spool shaft 20 mentioned below. The second side cover 7 is fastened to a mechanism mounting plate 34 by a plurality of screw members 11 (for example, five). The second side cover 7 rotatably supports the drive shaft 30. A clutch lever 17 is mounted to the second side cover 7. The mechanism mounting plate 34 that forms the frame 5 is disposed between the second side cover 7 and the second side plate 9.

Meanwhile, the clutch lever 17 is pivotally mounted to the rear portion of the second side cover 7. The clutch lever 17 is coupled with a clutch control mechanism 22. When the clutch lever 17 pivots, the clutch mechanism 21 moves to a clutch-on and a clutch-off position via the clutch control mechanism 22.

As shown in FIG. 2, a rotation transmission mechanism 19, a clutch mechanism 21, a clutch control mechanism 22, a drag mechanism 23, and a casting control mechanism 24 are disposed between the second side cover 7 and the mechanism mounting plate 34.

The rotation transmission mechanism 19 transmits the rotation of the handle 2 in the line winding direction to the spool 12. The details of the rotation transmission mechanism 19 will be described below.

The clutch mechanism 21 couples and decouples the handle 2 and the spool 12. When the clutch mechanism 21 is put in a clutch-off state (a decoupled state), the spool 12 is freely rotatable.

The clutch control mechanism 22 is for controlling the clutch mechanism 21.

The drag mechanism 23 brakes the rotation of the spool 12 in the casting direction.

The details of the drag mechanism 23 will be described below.

The casting control mechanism 24 adjusts the resistive force during the rotation of the spool 12.

Spool

As shown in FIG. 2, the spool 12 comprises a left and right pair of plate-like flanges 12a on both sides, as well as a tubular line winding cylinder part 12b disposed between the pair of flanges 12a. The spool 12 is non-rotatably fixed by, for example, serration bonding to a spool shaft 20 that extends through the inner peripheral side of the line winding cylinder part 12b. The fixing method is not limited to serration bonding, and various bonding methods can be used, such as key coupling, spline coupling, etc.

The spool shaft 20 is disposed substantially parallel to the drive shaft 30. The spool shaft 20 extends through the second side plate 9 and extends to a second boss portion 7f of the second side cover 7. The spool shaft 20 is rotatably supported by the reel body 1 via a first axle bearing 26a and a second axle bearing 26b on both sides of the spool 12.

A large diameter portion 20a is formed in the center of the spool shaft 20, and an engagement pin 29 of the clutch mechanism 21 is fixed to the large diameter portion 20a. The engagement pin 29 extends through the large diameter portion 20a in the radial direction, both ends of which protrude in the radial direction.

Rotation Transmission Mechanism

Figure 3:
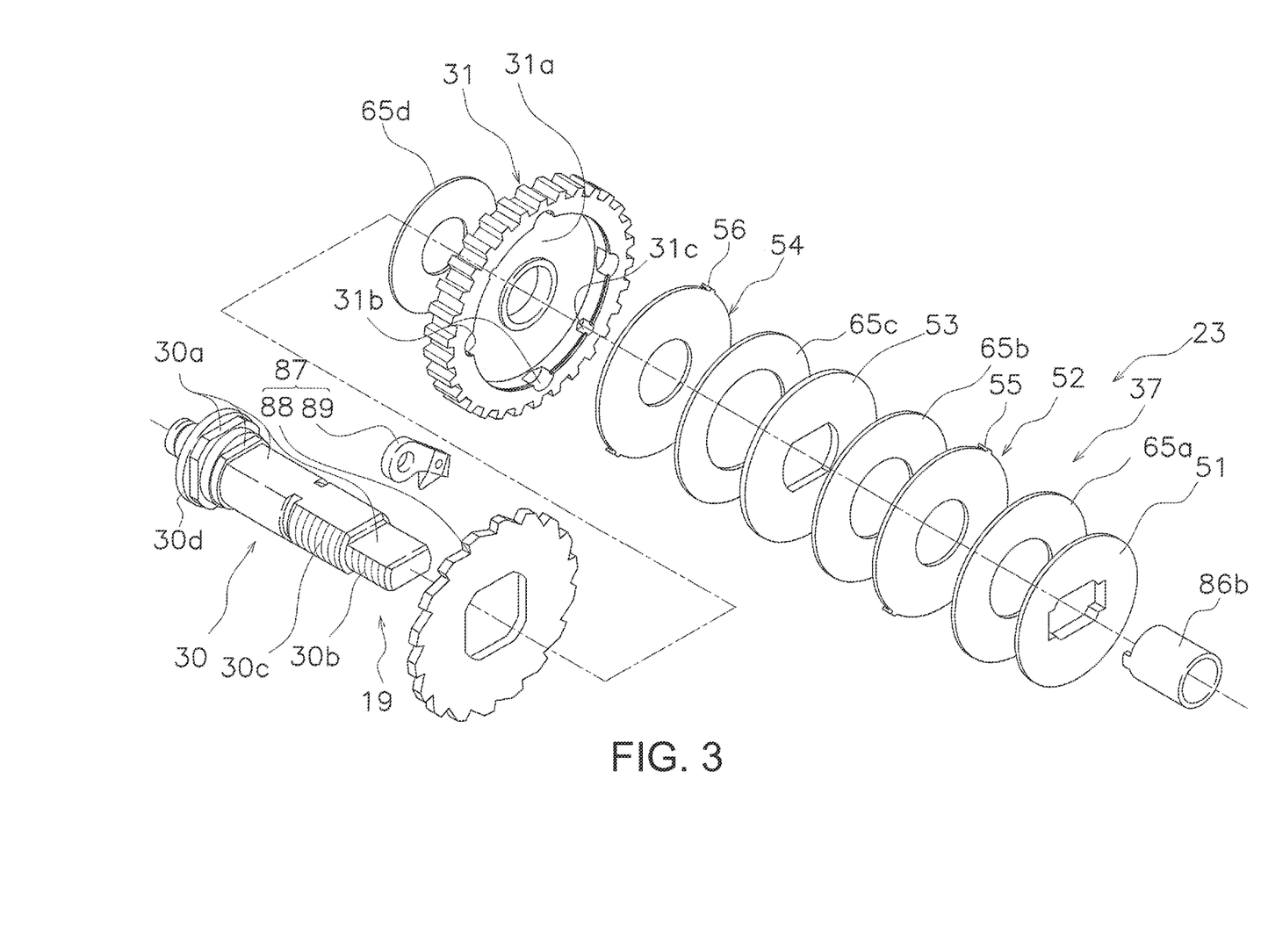
FIG. 3 is an exploded perspective view showing the configuration of the drag mechanism 23.

As shown in FIG. 2 and FIG. 3, the rotation transmission mechanism 19 comprises a drive shaft 30, a drive gear 31 that is fixed to the drive shaft 30, and a tubular pinion gear 32 that meshes with the drive gear 31.

The drive shaft 30 is rotatably mounted to the mechanism mounting plate 34 and the second side cover 7 via the axle bearing 15 and the axle bearing 16. As shown in FIG. 3, a plurality of detent portions 30a and flange portions 30d are formed on the drive shaft 30. Specifically, notched surfaces that are parallel with each other are formed in the plurality of detent portions 30a. The flange portion 30d is formed with a large diameter on the outer peripheral surface of the drive shaft 30.

Additionally, a first male threaded portion 30b and a second male threaded portion 30c are formed on the drive shaft 30. The arm portion 2a of the handle 2 is fixed to the first male threaded portion 30b. A star drag 36 (discussed below) for adjusting the drag force of the drag mechanism 23 is mounted on the second male threaded portion 30c.

In this embodiment, the drive shaft 30 is prohibited from rotating in the casting direction (reverse rotation) by a roller-type first one-way clutch 86 (refer to FIG. 2) and a pawl-type second one-way clutch 87 (refer to FIG. 3).

As shown in FIG. 2, the first one-way clutch 86 is mounted between the second side cover 7 and the drive shaft 30. The first one-way clutch 86 comprises an outer ring 86a and an inner ring 86b. The outer ring 86a is non-rotatably mounted to the first boss portion 7c. The inner ring 86b is non-rotatably coupled with the drive shaft 30. A rolling body 86c is disposed between the outer ring 86a and the inner ring 86b.

As shown in FIG. 3, the second one-way clutch 87 comprises a ratchet wheel 88 and a ratchet pawl 89. The ratchet wheel 88 is integrally and rotatably mounted to one of the detent portions 30a of the drive shaft 30. The ratchet wheel 88 is also disposed so as to come in contact with the flange portion 30d. That is, the ratchet wheel 88 transmits the pressing force of the star drag 36 to the flange portion 30d.

As shown in FIG. 2, the drive gear 31 is rotatably mounted to the drive shaft 30. The drive gear 31 is frictionally coupled with the drive shaft 30 via the drag mechanism 23. A circular housing recess 31a for housing the drag mechanism 23 is formed on the side surface of the drive gear 31 (the right side surface in FIG. 3).

A plurality of first engagement recesses 31b (for example, four) are formed on the inner peripheral surface of the housing recess 31a. A rotating member of a drag sounding mechanism, which is not diagrammed, integrally and rotatably engages with the plurality of first engagement recesses 31b. Additionally, a second engagement recess 31c is formed between two first engagement recesses 31b. Here, a plurality of second engagement recesses 31c (for example, two) is formed on the inner peripheral surface of the housing recess 31a so as to face each other. Locking lugs 55 and 56 of a friction mechanism 37 mentioned below integrally and rotatably engage with the plurality of second engagement recesses 31c.

As shown in FIG. 2, the pinion gear 32 is a tubular member. A spool shaft 20 extends through the pinion gear 32. The pinion gear 32 is movably mounted in the axial direction with respect to the spool shaft 20.

The left end of the pinion gear 32 in FIG. 2 is supported rotatably and movably in the axial direction with respect to the mechanism mounting plate 34 and the second boss portion 7f via the axle bearings 18a and 18b. The clutch mechanism 21 functions with the axial movement of the pinion gear 32 being controlled by the clutch control mechanism 22.

Drag Mechanism

The drag mechanism 23 is actuated when the fishing line is pulled at a force that exceeds the drag force after adjustment. That is, the spool 12 is capable of rotating in the casting direction when the drag mechanism 23 is actuated. As shown in FIG. 1 to FIG. 3, the drag mechanism 23 comprises a star drag 36 (one example of an adjustment member) and a friction mechanism 37, the drag force of which is adjusted by the star drag 36.

The star drag 36 is for adjusting the drag force. As shown in FIG. 2, the star drag 36 adjusts the drag force of the friction mechanism 37 via an adjustment mechanism 41 that changes the drag force of the friction mechanism 37. For example, the adjustment mechanism 41 engages the inner ring 86b of the first one-way clutch 86. When the star drag 36 is rotated, the pressing state of the adjustment mechanism 41 with respect to the inner ring 86b of the first one-way clutch 86 changes. Then, the drag force of the friction mechanism 37 is adjusted in response to the pressing state of the adjustment mechanism 41.

The friction mechanism 37 is capable of braking the rotation of the spool in the casting direction, and is disposed around the drive shaft 30, as shown in FIG. 2 and FIG. 3. The friction mechanism 37 is pressed by the adjustment mechanism 41 via the first one-way clutch 86 (e.g., by inner ring 86b).

As shown in FIG. 3, the friction mechanism 37 comprises a plurality of brake plate assemblies 51, 52, 53, and 54 (the first to the fourth brake plate assemblies discussed below) and a plurality of lining materials 65a, 65b, and 65c (the first to the third lining materials discussed below).

The plurality of brake plate assemblies comprise a first brake plate assembly 51, a second brake plate assembly 52, a third brake plate assembly 53, and a fourth brake plate assembly 54. The first brake plate assembly 51 engages the detent portion 30a of the drive shaft 30 and is integrally and rotatably coupled with the drive shaft 30. The first brake plate assembly 51 is also integrally and rotatably coupled with respect to the inner ring 86b of the first one-way clutch 86. Additionally, the inner ring 86b of the first one-way clutch 86 abuts the first brake plate assembly 51, and the inner ring 86b presses the first brake plate assembly 51. Consequently, the inner ring 86b is integrally rotatable with respect to the drive shaft 30, and the first brake plate assembly 51 is pressed by the inner ring 86b.

The second brake plate assembly 52 and the fourth brake plate assembly 54 are both integrally and rotatably coupled with the drive gear 31. The second brake plate assembly 52 and the fourth brake plate assembly 54 both have a pair of locking ears 55 and 56 that are bent toward the left on the outer peripheral surface. These locking ears 55 and 56 engage with the second engagement recesses 31c of the drive gear 31. Consequently, the second brake plate assembly 52 and the fourth brake plate assembly 54 are integrally rotatable with the drive gear 31. Additionally, the second brake plate assembly 52 and the fourth brake plate assembly 54 are disposed so as to be relatively rotatable with respect to the drive shaft 30.

The third brake plate assembly 53 engages with the detent portion 30a of the drive shaft 30 and is integrally and rotatably coupled with the drive shaft 30.

In this embodiment, the first one-way clutch 86 and the second one-way clutch 87 prohibit the drive shaft 30 from rotating in the casting direction (reverse rotation). Accordingly, the first brake plate assembly 51 and the third brake plate assembly 53, which are integrally and rotatably coupled with the drive shaft 30, also do not rotate in the casting direction. On the other hand, the second brake plate assembly 52 is disposed so as to be integrally rotatable with the drive gear 31 and to be relatively rotatable with respect to the drive shaft 30. That is, when the drive gear 31 is rotated, the second brake plate assembly 52 rotates relatively with respect to the drive shaft 30, that is, to the first brake plate assembly 51 and the third brake plate assembly 53.

The configuration of the first brake plate assembly 51, the second brake plate assembly 52, the third brake plate assembly 53, and the fourth brake plate assembly 54 will be described in detail below. The first brake plate assembly 51, the second brake plate assembly 52, the third brake plate assembly 53, and the fourth brake plate assembly 54 is a clad material.

Figure 4:
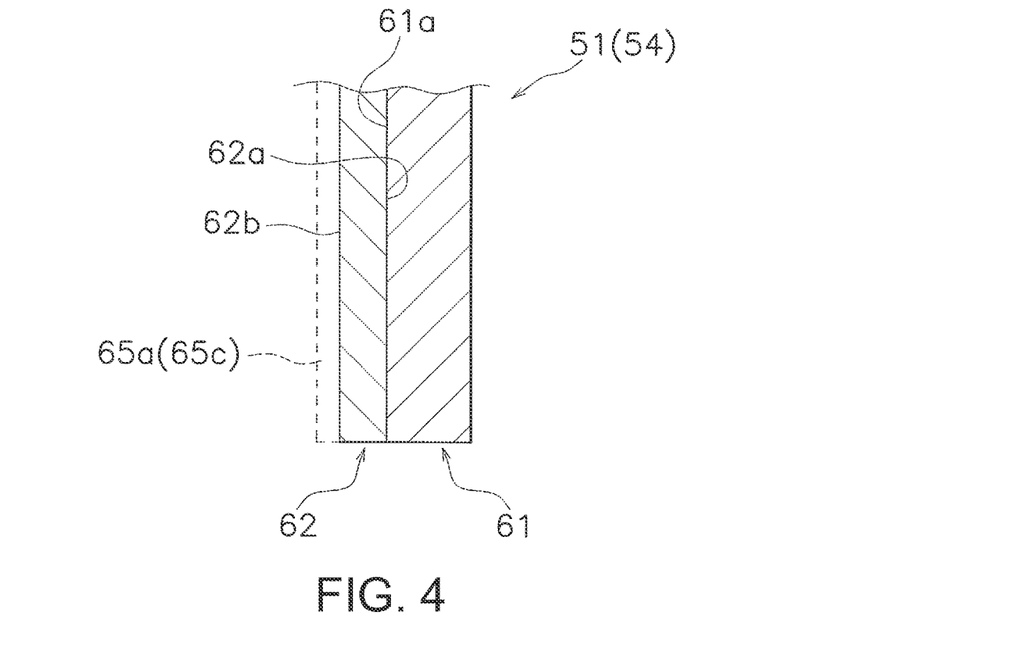
FIG. 4 is a partial enlarged view of the first and fourth brake plate assemblies according to one embodiment of the present invention.

As shown in FIG. 4, both the first brake plate assembly 51 and the fourth brake plate assembly 54 are formed by a first plate element 61 (one example of a first brake plate and a fourth brake plate) and a second plate element 62 (one example of a second brake plate and a fifth brake plate).

The first plate element 61 is formed by, for example, an aluminum alloy. The first plate element 61 comprises a first bonding surface 61a (one example of a first bonding surface and a fifth bonding surface). The inner ring 86b of the first one-way clutch 86 abuts the first plate element 61, and the first plate element 61 is pressed by the inner ring 86b.

Additionally, the wear resistance of the second plate element 62 is greater than that of the first plate element 61. The second plate element 62 is formed by, for example, a stainless steel alloy. The second plate element 62 comprises a second bonding surface 62a (one example of a second bonding surface and a sixth bonding surface) and a first frictional contact surface 62b. The second bonding surface 62a is bonded to the first bonding surface 61a of the first plate element 61.

The first frictional contact surface 62b of the first brake plate assembly 51 comes into frictional contact with a first lining material 65a mentioned below. Meanwhile, the first frictional contact surface 62b of the fourth brake plate assembly 54 comes into frictional contact with a third lining material 65c mentioned below.

To summarize the above, with the first bonding surface 61a of the first plate element 61 and the second bonding surface 62a of the second plate element 62 being bonded together, both the first brake plate assembly 51 and the fourth brake plate assembly 54 function as standalone brake plates.

Additionally, in the first brake plate assembly 51, which functions as a standalone brake plate, the second plate element 62 (the first frictional contact surface 62b) comes into frictional contact with the first lining material 65a. On the other hand, in the fourth brake plate assembly 54, which functions as a standalone brake plate, the second plate element 62 (the first frictional contact surface 62b) comes into frictional contact with the third lining material 65c.

Meanwhile, the locking ear portion 56 of the fourth brake plate assembly 54 is formed on both the first plate element 61 and the second plate element 62.

Figure 5:
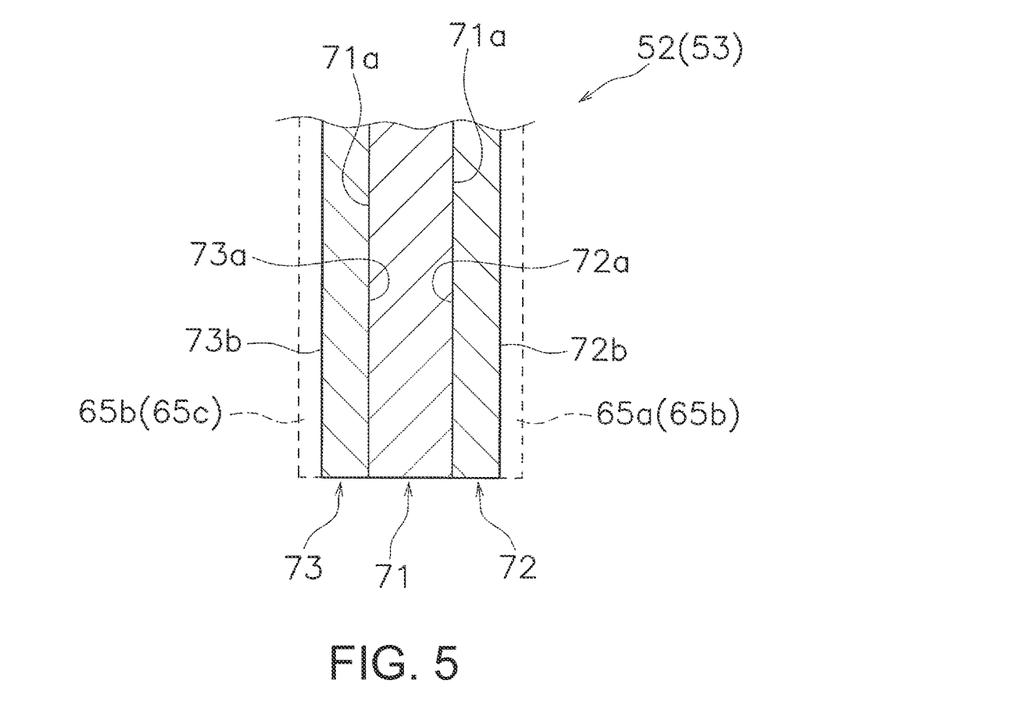
FIG. 5 is a partial enlarged view of the second and third brake plate assemblies according to one embodiment of the present invention.

As shown in FIG. 5, both the second brake plate assembly 52 and the third brake plate assembly 53 are formed by a third plate element 71 (one example of a first brake plate and a sixth brake plate), a fourth plate element 72 (one example of a second brake plate and a seventh brake plate), and a fifth plate element 73 (one example of a third brake plate and an eighth brake plate).

The third plate element 71 is formed by, for example, an aluminum alloy. The third plate element 71 comprises a third bonding surface 71a (one example of a third bonding surface and a seventh bonding surface) and a fourth bonding surface 71b (one example of a fourth bonding surface and an eighth bonding surface). The fourth bonding surface 71b is disposed on the opposite side of the third bonding surface 71a.

The wear resistance of the fourth plate element 72 is greater than that of the third plate element 71. The fourth plate element 72 is formed, for example, by a stainless steel alloy. The fourth plate element 72 comprises a fifth bonding surface 72a (one example of a ninth bonding surface) and a second frictional contact surface 72b. The fifth bonding surface 72a is bonded to the third bonding surface 71a of the third plate element 71.

The second frictional contact surface 72b of the second brake plate assembly 52 comes into frictional contact with the first lining material 65a. Meanwhile, the second frictional contact surface 72b of the third brake plate assembly 53 comes into frictional contact with a second lining material 65b discussed below.

The wear resistance of the fifth plate element 73 is greater than that of the third plate element 71. The fifth plate element 73 is formed, for example, by a stainless steel alloy. The fifth plate element 73 comprises a sixth bonding surface 73a (one example of a tenth bonding surface) and a third frictional contact surface 73b. The sixth bonding surface 73a is bonded to the fourth bonding surface 71b of the third plate element 71.

The third frictional contact surface 73b of the second brake plate assembly 52 comes into frictional contact with the second lining material 65b. The third frictional contact surface 73b of the third brake plate assembly 53 comes into frictional contact with the third lining material 65c.

To summarize the above, in both the second brake plate assembly 52 and the third brake plate assembly 53, the third bonding surface 71a of the third plate element 71, and the fifth bonding surface 72a of the fourth plate element 72 are bonded together, and the fourth bonding surface 71b of the third plate element 71 and the sixth bonding surface 73a of the fifth plate element 73 are bonded together. That is, both the second brake plate assembly 52 and the third brake plate assembly 53 function as standalone brake plates while the third plate element 71 is disposed between the fourth plate element 72 and the fifth plate element 73.

Additionally, in the second brake plate assembly 52, which functions as a standalone brake plate, the fourth plate element 72 (the second frictional contact surface 72b) comes into frictional contact with the first lining material 65a, and the fifth plate element 73 (the third frictional contact surface 73b) comes into frictional contact with the second lining material 65b. Also, in the third brake plate assembly 53, which functions as a standalone brake plate, the fourth plate element 72 (the second frictional contact surface 72b) comes into frictional contact with the second lining material 65b, and the fifth plate element 73 (the third frictional contact surface 73b) comes into frictional contact with the third lining material 65c.

Meanwhile, the locking ear portion 55 of the second brake plate assembly 52 is formed on the third plate element 71, the fourth plate element, and the fifth plate element 73.

Next, the configuration of the first lining material 65a, the second lining material 65b, and the third lining material 65c will be described in detail.

As shown in FIG. 3 to FIG. 5, the first lining material 65a is disposed between the first brake plate assembly 51 and the second brake plate assembly 52. One surface of the first lining material 65a comes into contact with the first brake plate assembly 51 (the first frictional contact surface 62b). The other surface of the first lining material 65a comes into contact with the second brake plate assembly 52 (the second frictional contact surface 72b).

The second lining material 65b is disposed between the second brake plate assembly 52 and the third brake plate assembly 53. One surface of the second lining material 65b comes into contact with the second brake plate assembly 52 (the third frictional contact surface 73b). The other surface of the second lining material 65b also comes into contact with the third brake plate assembly 53 (the second frictional contact surface 72b).

The third lining material 65c is disposed between the third brake plate assembly 53 and the fourth brake plate assembly 54. One surface of the third lining material 65c comes into contact with the third brake plate assembly 53 (the third frictional contact surface 73b). The other surface of the third lining material 65c comes into contact with the fourth brake plate assembly 54 (the first frictional contact surface 62b).

The first lining material 65a, the second lining material 65b, and the third lining material 65c is configured by, for example, a metal-based sintered material. Additionally, plate materials that come in frictional contact with each of these first to third lining materials 65a, 65b, and 65c are configured by a stainless steel alloy.

In this embodiment, the above-described ratchet wheel 88 is disposed to be adjacent to the drive gear 31 and rotates relatively. For this reason, a fourth lining material 65d is disposed between the ratchet wheel 88 and the drive gear 31. This fourth lining material 65d also contributes to the generation of drag force.

The fourth lining material is configured by, for example, carbon or felt. Here, an example was shown in which the fourth lining material is formed by, for example, carbon or felt, but the fourth lining material can also be formed by, for example, a metal-based sintered material.

Characteristics

The embodiment described above can be expressed as the following.

(A) The first brake plate assembly 51 and the fourth brake plate assembly 54 of the present dual-bearing reel 100 comprises a first plate element 61 and a second plate element 62. The first plate element 61 comprises a first bonding surface 61a. The second plate element 62 comprises a second bonding surface 62a. The second bonding surface 62a is bonded to the first bonding surface 61a of the first plate element 61. The wear resistance of the second plate element 62 is greater than that of the first plate element 61.

In the first brake plate assembly 51 and the fourth brake plate assembly 54, the first bonding surface 61a of the first plate element 61 and the second bonding surface 62a of the second plate element are bonded together. That is, both the first brake plate assembly 51 and the fourth brake plate assembly 54 function as standalone brake plates. Additionally, since the wear resistance of the second plate element 62 is greater than that of the first plate element 61, the first lining material 65a and the third lining material 65c come in frictional contact with the second plate element 62.

That is, in the first brake plate assembly 51 and the fourth brake plate assembly 54, the portion that comes into frictional contact with the first lining material 65a and the third lining material 65c is formed by the second plate element 62, and the portion that does not come into frictional contact with the first lining material 65a and the third lining material 65c is formed by the first plate element 61. Accordingly, the drag force can be enhanced by the second plate element 62, and the weight can be reduced by the first plate element 61. That is, it is possible to provide the first brake plate assembly 51 and the fourth brake plate assembly 54 such that they are able to simultaneously enhance the drag force and reduce the weight.

Additionally, the second brake plate assembly 52 and the third brake plate assembly 53 of the present dual-bearing reel 100 comprises the third plate element 71, the fourth plate element 72, and the fifth plate element 73. The third plate element 71 corresponds to the first plate element 61 of the first brake plate assembly 51 and the fourth brake plate assembly 54. The fourth plate element 72 and the fifth plate element 73 correspond to the second plate element 62 of the first brake plate assembly 51 and the fourth brake plate assembly 54. Therefore, the second brake plate assembly 52 and the third brake plate assembly 53 are able to obtain the same effects as the first brake plate assembly 51 and the fourth brake plate assembly 54.

(B) In the first to the fourth brake plate assemblies 51, 52, 53, and 54 of the present dual-bearing reel 100, the first plate element 61 and the third plate element 71 are formed by an aluminum alloy.

In this embodiment, since the first plate element 61 and the third plate element 71 are formed by an aluminum alloy, it is possible to reduce the weight of the first to the fourth brake plate assemblies 51, 52, 53, and 54.

(C) In the first to the fourth brake plate assemblies 51, 52, 53, and 54 of the present dual-bearing reel 100, the second plate element 62, the fourth plate element 72, and the fifth plate element 73 are formed by a stainless steel alloy.

In this embodiment, since the second plate element 62, the fourth plate element 72, and the fifth plate element 73 are formed by a stainless steel alloy, it is possible to enhance the wear resistance of the first to the fourth brake plate assemblies 51, 52, 53, and 54.

(D) The second brake plate assembly 52 and the third brake plate assembly 53 of the present dual-bearing reel 100 comprises a fourth plate element 72 and a fifth plate element 73. The wear resistance of the fourth plate element 72 and the fifth plate element 73 is greater than that of the third plate element 71.

Accordingly, the fourth plate element 72 comprises a fifth bonding surface 72a, and the fifth plate element 73 comprises a sixth bonding surface 73a. The fifth bonding surface 72a is bonded to the third bonding surface 71a of the third plate element 71. The sixth bonding surface 73a is bonded to the fourth bonding surface 71b of the third plate element 71. That is, both the second brake plate assembly 52 and the third brake plate assembly 53 function as standalone brake plates in a state in which the third plate element 71 is disposed between the fourth plate element 72 and the fifth plate element 73, and they are bonded together.

Additionally, in this embodiment, the wear resistance of the fourth plate element 72 and the fifth plate element 73 is greater than that of the third plate element 71. Accordingly, the first lining material 65a comes into frictional contact with the fourth plate element 72 of the second brake plate assembly 52. The second lining material 65b comes into frictional contact with the fifth plate element 73 of the second brake plate assembly 52. On the other hand, the second lining material 65b comes into frictional contact with the fourth plate element 72 of the third brake plate assembly 53. The third lining material 65c comes into frictional contact with the fifth plate element 73 of the third brake plate assembly 53.

Accordingly, the drag force can be enhanced by the fourth plate element 72 and the fifth plate element 73, and the weight can be reduced by the third plate element 71. That is, it is possible to provide the second brake plate assembly 52 and the third brake plate assembly 53 such that they are able to simultaneously enhance the drag force and reduce the weight.

(E) The present dual-bearing reel 100 comprises a reel body 1, a spool 12, and a drag mechanism 23. The spool 12 is rotatably mounted to the reel body 1. The drag mechanism 23 comprises a friction mechanism 37. The friction mechanism 37 is able to brake the rotation of the spool 12 in the casting direction, and comprises first to fourth brake plate assemblies 51, 52, 53, and 54 and first to third lining materials 65a, 65b, and 65c.

In the present dual-bearing reel 100, the friction mechanism 37 of the drag mechanism 23 is able to brake the rotation of the spool 12 in the casting direction. In this embodiment, since the friction mechanism 37 comprises first to fourth brake plate assemblies 51, 52, 53, and 54 and first to third lining materials 65*a*, 65*b*, and 65*c*, obtaining the same effects as described above is possible.

(F) The present dual-bearing reel 100 comprises a reel body 1, a spool 12, and a drag mechanism 23. The spool 12 is rotatably mounted to the reel body 1. The drag mechanism 23 comprises a friction mechanism 37. The friction mechanism 37 is able to brake the rotation of the spool 12 in the casting direction. The friction mechanism 37 comprises first to fourth brake plate assemblies 51, 52, 53, and 54 and first to third lining materials 65*a*, 65*b*, and 65*c*.

The first brake plate assembly 51 and the fourth brake plate assembly 54 comprise a first plate element 61 and a second plate element 62. The first plate element 61 comprises a first bonding surface 61*a*.

The wear resistance of the second plate element 62 is greater than that of the first plate element 61. The second plate element 62 comprises a second bonding surface 62*a* and a first frictional contact surface 62*b*. The second bonding surface 62*a* is bonded to the first bonding surface 61*a* of the first plate element 61. Accordingly, the first frictional contact surface 62*b* of the first brake plate assembly 51 comes into frictional contact with the first lining material 65*a*. On the other hand, the first frictional contact surface 62*b* of the fourth brake plate assembly 54 comes into frictional contact with the third lining material 65*c*.

Both the second brake plate assembly 52 and the third brake plate assembly 53 comprise a third plate element 71, a fourth plate element 72, and a fifth plate element 73.

The third plate element 71 comprises a third bonding surface 71*a* and a fourth bonding surface 71*b*. The fourth bonding surface 71*b* is provided on the opposite side of the third bonding surface 71*a*.

The wear resistance of the fourth plate element 72 is greater than that of the third plate element 71. The fourth plate element 72 comprises a fifth bonding surface 72*a* and a second frictional contact surface 72*b*. The fifth bonding surface 72*a* is bonded to the third bonding surface 71*a* of the third plate element 71. Here, the second frictional contact surface 72*b* of the second brake plate assembly 52 comes into frictional contact with the first lining material 65*a*. On the other hand, the second frictional contact surface 72*b* of the third brake plate assembly 53 comes into frictional contact with the second lining material 65*b*.

The wear resistance of the fifth plate element 73 is greater than that of the third plate element 71. The fifth plate element 73 comprises a sixth bonding surface 73*a* and a third frictional contact surface 73*b*. The sixth bonding surface 73*a* is bonded to the fourth bonding surface 71*b* of the third plate element 71. Here, the third frictional contact surface 73*b* of the second brake plate assembly 52 comes into frictional contact with the second lining material 65*b*. The third frictional contact surface 73*b* of the third brake plate assembly 53 comes into frictional contact with the third lining material 65*c*.

In the present dual-bearing reel 100, the first brake plate assembly 51 and the fourth brake plate assembly 54 function as standalone brake plates in a state in which the first plate element 61 and the second plate element 62 are bonded together. Additionally, the first brake plate assembly 51 comes into frictional contact with the first lining material 65*a*. On the other hand, the fourth brake plate assembly 54 comes into frictional contact with the third lining material 65*c*.

In the second brake plate assembly 52 and the third brake plate assembly 53, both the second brake plate assembly 52 and the third brake plate assembly 53 function as standalone brake plates in a state in which the third plate element 71 is disposed between the fourth plate element 72 and the fifth plate element 73 and they are bonded together. Additionally, the second brake plate assembly 52 comes into frictional contact with the first lining material 65*a* and the second lining material 65*b*. The third brake plate assembly 53 also comes into frictional contact with the second lining material 65*b* and the third lining material 65*c*.

Accordingly, in the present fishing reel 100, it is possible to reduce the weight of the brake plate assembly with the first plate element 61 of the first and the fourth brake plate assemblies 51 and 54 and the third plate element 71 of the second and the third brake plate assemblies 52 and 53. Additionally, it is possible to enhance the drag force with the second plate element 62 of the first and fourth brake plate assemblies 51 and 54 and the fourth and fifth plate elements 72 and 73 of the second and third brake plate assemblies 52 and 53. That is, it is possible to provide a dual-bearing reel 100 that is able to simultaneously enhance the drag force and reduce the weight.

(G) In the present dual-bearing reel 100, the first to the third lining materials 65*a*, 65*b*, and 65*c* are formed by a metal-based sintered material.

In this embodiment, since the first to the third lining materials 65*a*, 65*b*, and 65*c* are formed by a metal-based sintered material, it is possible to enhance the drag force. Additionally, even if the first to the third lining materials 65*a*, 65*b*, and 65*c* are formed by a metal-based sintered material, it is possible to reduce the weight of the first to the fourth brake plate assemblies 51, 52, 53, and 54.

(H) In the present dual-bearing reel 100, the drag mechanism 23 further comprises a star drag 36 for adjusting the first brake plate assembly 51.

In this embodiment, the first brake plate assembly 51 is adjusted by the star drag 36. Then, the pressure state of the first to the fourth brake plate assemblies 51, 52, 53, and 54 and the first to the third lining materials 65*a*, 65*b*, and 65*c*, that is, the frictional force between the first to the fourth brake plate assemblies 51, 52, 53, and 54 and the first to the third lining materials 65*a*, 65*b*, and 65*c*, changes. That is, when the first brake plate assembly 51 is adjusted by the star drag 36, the frictional force in the friction mechanism 37 changes. Accordingly, in the present dual-bearing reel 100, it is possible to reliably change the frictional force in the friction mechanism 37 with the star drag 36.

Other Embodiments

One embodiment of the present invention is described above, but the present invention is not limited to the above-described embodiment; various modifications can be made without departing from the scope of the invention. In particular, the various embodiments and modified examples described in the present Specification can be freely combined according to necessity.

(a) In the above-described embodiment, an example is provided in which the first to fourth brake plate assemblies 51, 52, 53, and 54 are used as the drag mechanism 23 of the dual-bearing reel 100; however, the first to fourth brake plate assemblies 51, 52, 53, and 54 can be applied to a drag mechanism of a spinning reel.

(b) In the first to fourth brake plate assemblies 51, 52, 53, and 54 of the above-described embodiment, at least one of the first to the fifth plate elements 61, 62, 71, 72, and 73 can comprise at least one hole (one example of a first hole and/or a second hole).

For example, as shown in FIG. 6A, FIG. 6B, FIG. 7A, and FIG. 7B, the second brake plate assembly 52 can comprise holes 90 and 91. Meanwhile, the thickness of the second brake plate assembly 52 has been enlarged in FIG. 6A and FIG. 7A in order to facilitate the description.

Figure 6A:
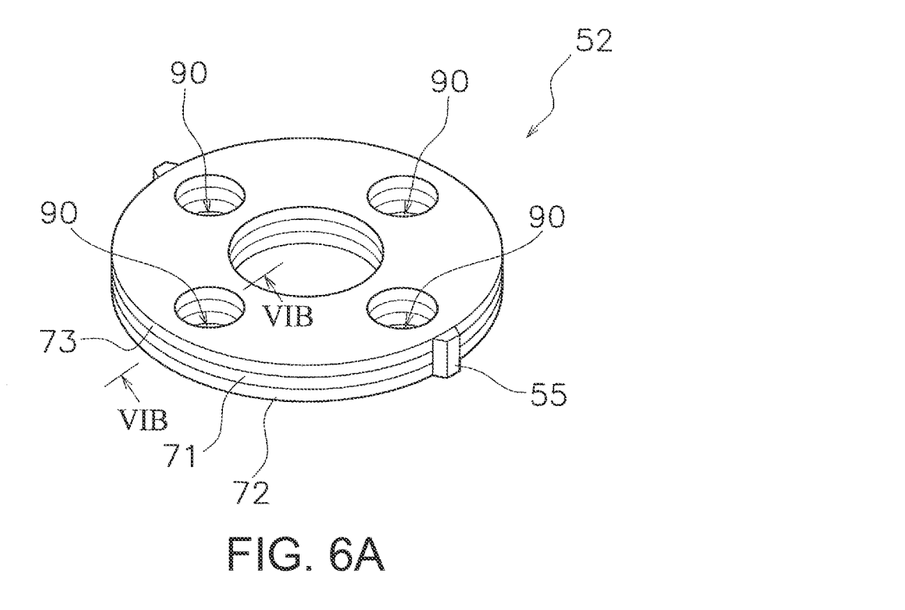
FIG. 6A is a perspective view illustrating another embodiment in which the brake plate assembly comprises holes (Part 1: when there are holes in the thickness direction).
Figure 6B:
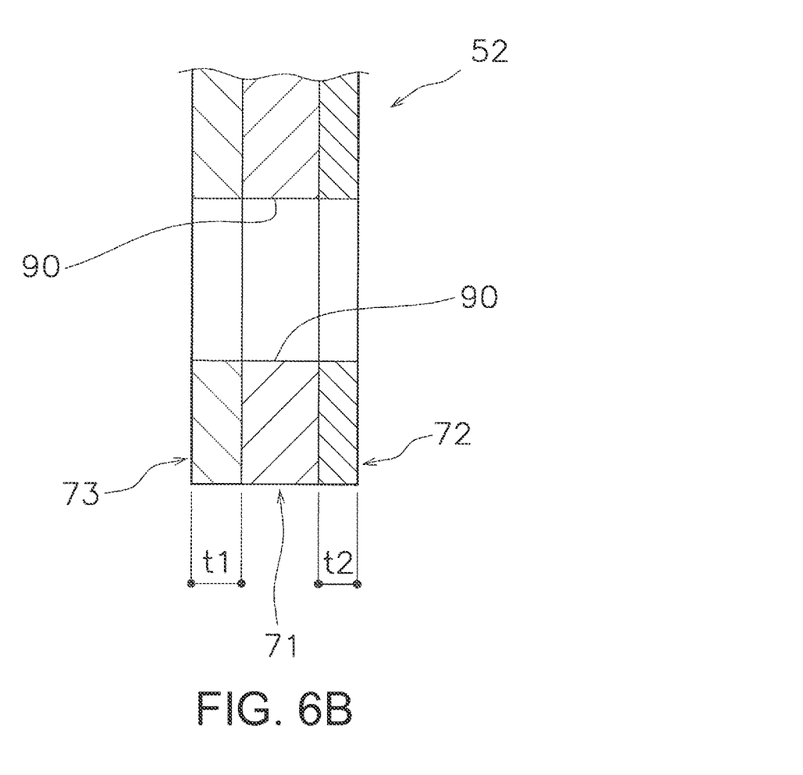
FIG. 6B is a cross-sectional view of the section line VB-VIB in FIG. 6A.

As shown in FIG. 6A and FIG. 6B, in the second brake plate assembly 52, the holes 90 can extend in the thickness direction of the third to the fifth plate elements 71, 72, and 73. Effectively reducing the weight while maintaining the strength as a brake plate is possible by forming the holes 90 in this way.

Meanwhile, while not illustrated, at least one hole can be formed in one or two of the third to the fifth plate elements 71, 72, and 73. Additionally, as described herein, an example is provided in which the holes 90 are formed at intervals at prescribed angles in the peripheral direction; however, the angle at which the holes 90 are formed can be any angle.

Figure 7A:
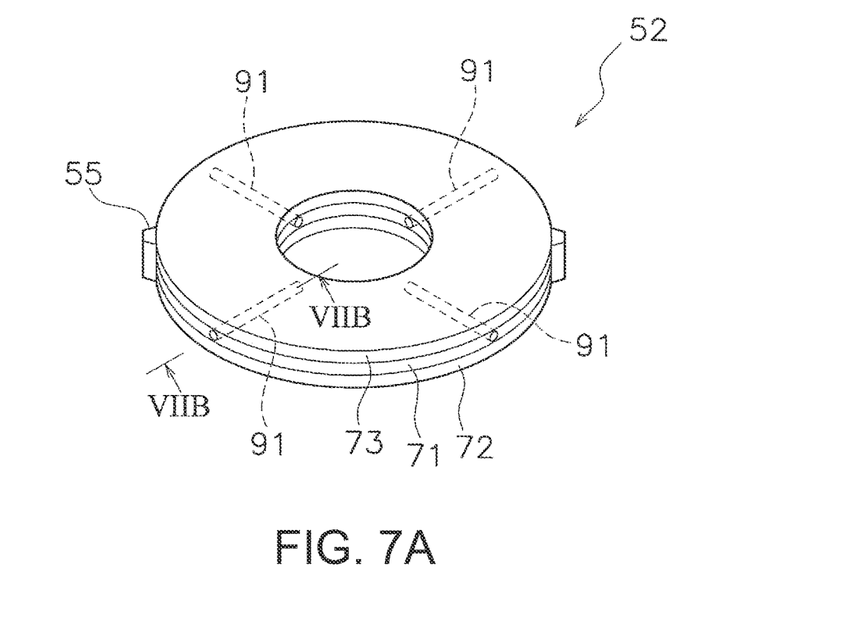
FIG. 7A is a perspective view illustrating another embodiment in which the brake plate assembly comprises holes (Part 2: when there are holes in a direction that intersects with the thickness direction).
Figure 7B:
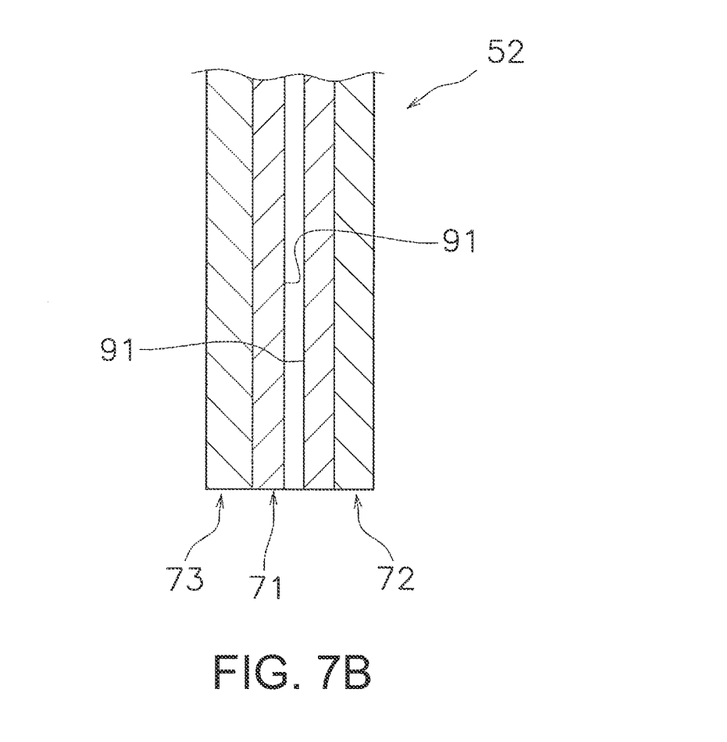
FIG. 7B is a cross-sectional view of the section line VIIB-VIIB in FIG. 7A.

Also, as shown in FIG. 7A and FIG. 7B, in the second brake plate assembly 52, holes 91 can extend in a direction that intersects with the thickness direction of the third plate element 71. Maintaining the bonding area of the bonding surfaces 62a, 72a, and 73a in the second brake plate assembly 52 is possible by forming the holes 91 in this way. Consequently, it is possible to effectively reduce the weight while maintaining the joining strength.

Meanwhile, as described herein, an example is provided in which the holes 91 are formed at intervals at prescribed angles in the peripheral direction, but the angle at which the holes 91 are formed can be any angle. Meanwhile, while not illustrated, the above-described holes 91 can be formed in two or all of the third to the fifth plate elements 71, 72, and 73.

Meanwhile, in FIG. 6A, FIG. 6B, FIG. 7A, and FIG. 7B the holes 90 and 91 are explained using the second brake plate assembly 52, but the same holes 90 and 91 can also be formed in the first brake plate assembly 51, the third brake plate assembly 53, and the fourth brake plate assembly 54.

With the above-described configuration, it is possible to effectively reduce the weight of the first to the fourth brake plate assemblies 51, 52, 53, and 54.

(c) In the second brake plate assembly 52 of the above-described embodiment, as shown in FIG. 6B, the thickness t1 of the fifth plate element 73 can be configured to be thicker than the thickness t2 of the fourth plate element 72. Also, while not illustrated, it is possible to configure the thickness t1 of the fifth plate element 73 to be thicker than the thickness t2 of the fourth plate element 72 in the same way as with the second brake plate assembly 52 in the third brake plate assembly 53.

Consequently, it is possible to configure the lining material 65b (65c) on the fifth plate element 73 side from a material with a greater frictional force or a material with a different characteristic than the lining material 65a (65b) on the fourth plate element 72 side. Accordingly, since the width of the selection of lining material can be widened, the adjustment range of the drag performance (the friction performance) can be expanded.

Meanwhile, in FIG. 6B, an example is provided in which the thickness t1 of the fifth plate element 73 is thicker than the thickness t2 of the fourth plate element 72; however, the configuration can be such that the thickness of the fourth plate element 72 is thicker than the thickness of the fifth plate element 73. In this embodiment as well, it is possible to expand the adjustment range of the drag performance (the friction performance).

(d) In both the second brake plate assembly 52 and the third brake plate assembly 53 of the embodiment described above, the wear resistance of the fourth plate element 72 (or the fifth plate element 73) can be greater than that of the fifth plate element 73 (or the fourth plate element 72).

In this embodiment, it is possible to configure the lining materials 65a and 65b (the lining materials 65b and 65c) on the fourth plate element 72 (or the fifth plate element 73) side from a material that has a greater frictional force or a material that has a different characteristic than the lining materials 65b and 65c (the lining materials 65a and 65b) on the fifth plate element 73 (or the fourth plate element 72) side. In this manner, since the width of the selection of the lining material can be widened, the adjustment range of the drag performance (the friction performance) can be expanded.

What is claimed is:

1. A brake plate assembly in a drag mechanism of a fishing reel, comprising:
    a first brake plate having a first bonding surface; and
    a second brake plate having a second bonding surface bonded to the first bonding surface, and having greater wear resistance than that of the first brake plate.

2. The brake plate assembly for the drag mechanism of the fishing reel recited in claim 1, wherein
    the first brake plate is an aluminum alloy.

3. The brake plate assembly for the drag mechanism of the fishing reel recited in claim 1, wherein
    the second brake plate is a stainless steel alloy.

4. The brake plate assembly for the drag mechanism of the fishing reel recited in claim 2, wherein
    the second brake plate is a stainless steel alloy.

5. The brake plate assembly for the drag mechanism of the fishing reel recited in claim 1, wherein
    at least one of the first brake plate and the second brake plate includes at least one first hole.

6. The brake plate assembly for the drag mechanism of the fishing reel recited in claim 5, wherein
    the first hole extends in a thickness direction of at least one of the first brake plate and the second brake plate.

7. The brake plate assembly for the drag mechanism of the fishing reel recited in claim 5, wherein
    the first hole extends in a direction that intersects with a thickness direction of at least one of the first brake plate and the second brake plate.

8. The brake plate assembly for the drag mechanism of the fishing reel recited in claim 1, further comprising
    a third brake plate having a greater wear resistance than that of the first brake plate,
    the first brake plate including a third bonding surface disposed on the opposite side of the first bonding surface, and
    the third brake plate including a fourth bonding surface bonded to the third bonding surface.

9. The brake plate assembly for the drag mechanism of the fishing reel recited in claim 8, wherein
    the third brake plate is a stainless steel alloy.

10. The brake plate assembly for the drag mechanism of the fishing reel recited in claim 8, wherein
    the wear resistance of the third brake plate is greater than that of the second brake plate.

11. The brake plate assembly for the drag mechanism of the fishing reel recited in claim 8, wherein
    a thickness of the third brake plate is greater than a thickness of the second brake plate.

12. The brake plate assembly for the drag mechanism of the fishing reel recited in claim 8, wherein
    the third brake plate includes at least one second hole.

13. The brake plate assembly for the drag mechanism of the fishing reel recited in claim 12, wherein the second hole extends in a thickness direction of the third brake plate.

14. The brake plate assembly for the drag mechanism of the fishing reel recited in claim 13, wherein
the second hole extends in a direction that intersects with the thickness direction.

15. A fishing reel, comprising:
a reel body;
a spool rotatably mounted to the reel body; and
a drag mechanism having a braking structure configured to brake the rotation of the spool in a casting direction,
the braking structure including a lining material and the brake plate assembly for the drag mechanism of the fishing reel recited in claim 1.

16. The fishing reel recited in claim 15, wherein
the lining material is a metal-based sintered material.

17. A fishing reel, comprising:
a reel body;
a spool rotatably mounted to the reel body; and
a drag mechanism having a braking structure configured to brake the rotation of the spool in a casting direction,
the braking structure including a first lining material, a second lining material, a first brake plate assembly, and a second brake plate assembly,
the first brake plate assembly including
a fourth brake plate having a fifth bonding surface, and
a fifth brake plate having a first frictional contact surface configured to frictionally contact a sixth bonding surface bonded to the fifth bonding surface and the first lining material having a greater wear resistance than that of the fourth brake plate, and
the second brake plate assembly including
a sixth brake plate having a seventh bonding surface and an eighth bonding surface disposed on an opposite side of the seventh bonding surface,
a seventh brake plate having a second frictional contact surface configured to frictionally contact a ninth bonding surface bonded to the seventh bonding surface and the first lining material having a greater wear resistance than that of the sixth brake plate, and
an eighth brake plate having a third frictional contact surface configured to frictionally contact a tenth bonding surface bonded to the eighth bonding surface and the second lining material having a greater wear resistance than that of the sixth brake plate.

18. The fishing reel recited in claim 17, wherein
the first lining material and the second lining material are a metal-based sintered material.

19. The fishing reel recited in claim 18, wherein
the drag mechanism includes an adjustment member configured to adjust the first brake plate assembly.

* * * * *